United States Patent Office 3,549,665
Patented Dec. 22, 1970

3,549,665
ANTHRAQUINONE DYESTUFFS
Arthur Buehler, Rheinfelden, and René de Montmollin, Riehen, Switzerland, assignors to Ciba Limited, Basel, Switzerland, a Swiss company
No Drawing. Continuation-in-part of application Ser. No. 561,031, June 28, 1966. This application Jan. 21, 1969, Ser. No. 792,829
Claims priority, application Switzerland, July 7, 1965, 9,557/65
Int. Cl. C09b 1/40
U.S. Cl. 260—372  3 Claims

ABSTRACT OF THE DISCLOSURE

Anthraquinone compounds of the formula

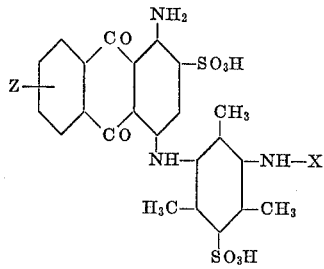

in which Z represents a sulphonic acid group and X a member selected from the group consisting of the $\alpha,\beta$-dihalogenated propionyl or $\alpha$-bromacryl group, are valuable reactive dyestuffs which dye cellulose fibers and wool blue tints of good wet fastness properties.

CROSS-REFERENCE TO RELATED APPLICATION

This is a continuation-in-part application of our copending application Ser. No. 561,031, filed June 28, 1966, now abandoned.

The present invention provides new dyestuffs of the anthraquinone series which contain at least two groups imparting solubility in water and which correspond to the formula (1)

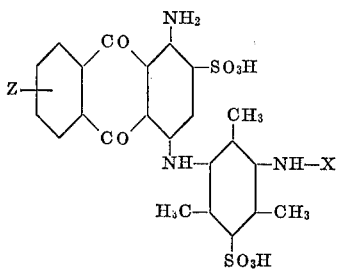

in which X represents a dihalogenated propionyl residue or an $\alpha$-bromacrylic residue and Z represents a hydrogen atom or a sulphonic acid group.

The new dyestuffs may be made in accordance with the invention by acylating anthraquinone dyestuffs of the formula (2)

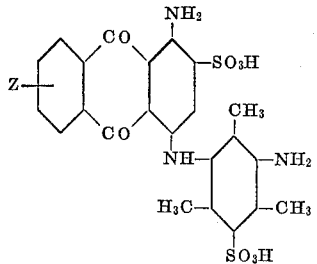

in which Z has the meaning ascribed to it in Formula 1, with dihalogenated propionic acid anhydrides or halides or with $\alpha$-bromacrylic acid halides.

Anthraquinone dyestuffs of Formula 2 that may be used as starting materials in the process of the present invention are 1-amino-4-(3'-amino-2',4',6'-trimethylphenylamino)-anthraquinone-2,5'-disulphonic acid and the corresponding 2,5',6-trisulphonic acid.

Suitable acid anhydrides or halides are, for example, $\alpha,\beta$-dichloropropionic acid anhydride and especially the acid chlorides and bromides of $\alpha,\beta$-dibromopropionic acid and $\alpha$-bromacrylic acid.

Acylation of the anthraquinone dyestuffs of Formula 2 with the said acid anhydrides or halides in accordance with the invention is advantageously carried out in the presence of an agent capable of binding acid, for example, sodium acetate, sodium hydroxide or sodium carbonate, preferably in aqueous medium. It is often advantageous to use an excess of acylating agent and to carry out the acylation process at a pH value between 5 and 8.

The $\alpha$-bromacrylic acid derivatives of the invention are also obtainable from the corresponding $\alpha,\beta$-dibromopropionic acid derivatives by elimination of hydrogen bromide. For example, a dyestuff of the formula

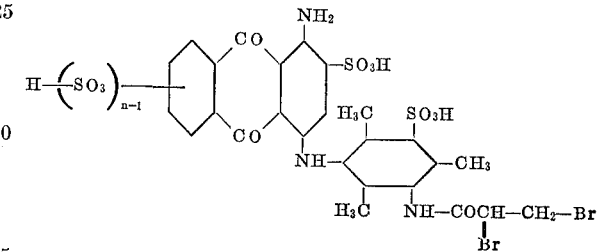

in which $n$ is 1 or 2, can be treated with alkaline substances, for example, with alkali metal hydroxides, preferably at room temperature; the corresponding $\alpha$-bromacrylic derivative is formed and can be isolated in the usual manner.

The products of Formula 1 obtainable by the process of the invention are new. They are valuable dyestuffs which are suitable for dyeing and printing a very wide variety of materials, for example, polyhydroxylated materials of fibrous structure, natural and regenerated celluose, and especially nitrogenous textile materials, for example, silk, wool and synthetic fibers, for example, those made from polyamides and polyurethanes. Dyeing is advantageously carried out in the presence of dyeing adjuvants, for example, levelling agents made from higher-molecular-weight aliphatic amines and ethylene oxide. The dyeings and prints obtained are distinguished by exceptional purity of tint, by a very good fastness to light and excellent properties of wet fastness, for example fastness to fulling, washing and repeated washing, perborate washing, perspiration, dry cleaning, wet rubbing, acids, alkalies, hot water and sea water and pleating.

The following examples illustrate the invention. Unless otherwise stated, the parts and percentages are by weight.

EXAMPLE 1

53.1 parts of 1-amino-4-(5'-amino-2',4',6'-trimethyl-phenylamino)-anthraquinone-2,3'-disulphonic acid are dissolved in 500 parts of water having a temperature of 0 to 5° C. in the presence of 20 parts by volume of 10 N sodium hydroxide and the solution is neutralized. 14.3 parts of sodium bicarbonate are added and then 31.2 parts of $\alpha,\beta$-dibromopropionyl chloride are slowly added dropwise while stirring, the temperature of the reaction mixture being kept at below 5° C. by the addition of ice. After acylation, the dyestuff is salted out with 100 parts of sodium chloride, isolated by filtration and dried at 80 to 90° C. A dark blue powder is obtained which dissolves in water and dyes wool brilliant blue tints fast to wet treatments.

EXAMPLE 2

53.1 parts of 1-amino-4-(5'-amino-2',4',6'-trimethylamino)-anthraquinone-2,3-disulphonic acid are dissolved in 500 parts of water having a temperature of 0 to 5° C. in the presence of 20 parts by volume of 10 N sodium hydroxide and the solution is neutralized. 14.5 parts of sodium bicarbonate are added to the solution and then 27.8 parts of α-bromacrylic acid bromide are added dropwise while stirring vigorously, the temperature of the reaction mixture being kept at between 0 and 5° C. by the addition of ice. After acylation, the dyestuff is salted out with 100 parts of sodium chloride, isolated by filtration and then dried in vacuo at 60 to 70° C. A water-soluble, dark blue powder is obtained which dyes wool pure blue tints fast to wet treatments.

EXAMPLE 3

78.5 parts of the dyestuff obtained in the manner described in Example 1 are dissolved in 500 parts of water, the pH value is adjusted to 12 to 13 with 12 parts by volume of 10 N sodium hydroxide solution, the batch is stirred for 20 minutes at room temperature and is subsequently neutralized to pH 7 with about 10 parts by volume of 2 N hydrochloric acid. The dyestuff so obtained is salted out with 100 parts of sodium chloride, isolated by filtration and then dried in vacuo at 60 to 70° C. It corresponds to the dyestuff obtained in the manner described in Example 2.

Dyeing prescription 100 parts of woolen knitting yarn are entered into a dyebath at 50 to 80° C. containing 10 parts of sodium sulphate crystals, 6 parts of 40% acetic acid, 0.5 part of the addition product prepared from oleylamine and ethylene oxide described under (A) below and 2 parts of the dyestuff described in Example 1 in 3,000 parts of water. The dyebath is raised to the boil during 30 minutes, and dyeing is continued for one hour at the boil. The wool is then rinsed and dried. A level blue dyeing is obtained.

(A) *Preparation of the ethylene oxide addition product.*—1 part of finely divided sodium is added to 100 parts of commercial oleylamine, the mixture is heated to 140° C., and ethylene oxide is introduced at 135 to 140° C. As soon as the ethylene oxide is absorbed rapidly, the reaction temperature is reduced to 120 to 125° C. and the introduction of ethylene oxide is continued until 113 parts have been absorbed. The reaction product so obtained gives a practically clear solution in water.

EXAMPLE 4

61.1 parts of 1-amino-4-(5'-amino - 2',4',6'-trimethylphenylamino)-3-anthraquinone-2,6,3'-trisulphonic acid are dissolved in 500 parts of water having a temperature of 0 to 5° C. in the presence of 30 parts by volume of 10 N sodium hydroxide and the solution is neutralized. 14.3 parts of sodium bicarbonate are added and then 31.2 parts of α,β-dibromopropionyl chloride are slowly added dropwise while stirring, the temperature of the reaction mixture being kept at below 5° C. by the addition of ice. After acylation, the dyestuff is salted out with sodium chloride, isolated by filtration and dried at 80 to 90° C. A water-soluble, dark blue powder is obtained which dyes wool brilliant blue tints fast to wet treatments.

Dyestuffs having similar properties are obtained by using 1-amino - 4-(5'-amino-2',4',6'-trimethylphenylamino)-anthraquinone-2,5,3'-trisulphonic acid or 1-amino-4-(5'-amino-2',4',6' - trimethylphenylamino) - anthraquinone-2,8,3'-trisulphonic acid or a mixture of these two trisulphonic acids instead of 1-amino-4-(5'-amino-2',4',6'-trimethylphenylamino)- anthraquinone-2,6,3'-trisulphonic acid.

What is claimed is:
1. A dyestuff of the formula

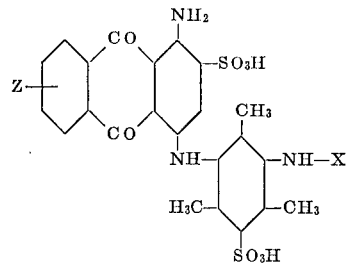

wherein Z represents a member selected from the group consisting of a hydrogen atom and a sulfonic acid group and X represents a member selected from the group consisting of the substituents

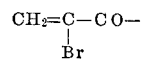

and $$CH_2=C-CO-$$
$$\phantom{CH_2=C-}|$$
$$\phantom{CH_2=C-}Br$$

2. The dyestuff of the formula

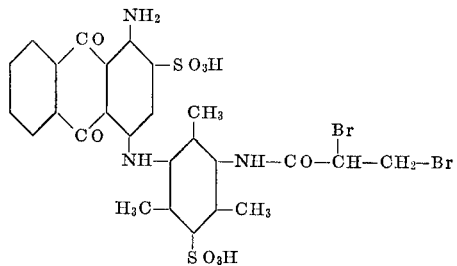

3. The dyestuff of the formula

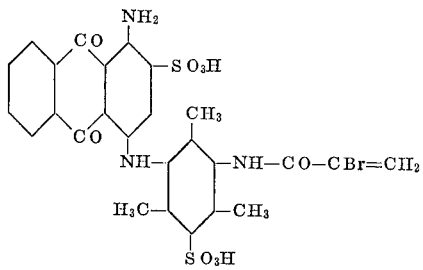

References Cited
FOREIGN PATENTS 1,342,433   9/1963   France.
1,372,343   8/1964   France.

JAMES A. PATTEN, Primary Examiner
E. J. SKELLY, Assistant Examiner

U.S. Cl. X.R.
8—4, 39, 40